(12) United States Patent
Ryu et al.

(10) Patent No.: US 11,800,347 B2
(45) Date of Patent: Oct. 24, 2023

(54) USER EQUIPMENT (UE) CAPABILITY AND ASSISTANCE INFORMATION EXCHANGE OVER SIDELINKS

(71) Applicant: QUALCOMM Incorporated, San Diego, CA (US)

(72) Inventors: Jung Ho Ryu, Fort Lee, NJ (US); Sony Akkarakaran, Poway, CA (US); Junyi Li, Franklin Park, NJ (US); Tao Luo, San Diego, CA (US); Qian Zhang, Basking Ridge, NJ (US); Kiran Venugopal, Raritan, NJ (US); Tianyang Bai, Somerville, NJ (US); Ling Ding, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/223,982

(22) Filed: Apr. 6, 2021

(65) Prior Publication Data

US 2021/0321250 A1    Oct. 14, 2021

Related U.S. Application Data

(60) Provisional application No. 63/008,599, filed on Apr. 10, 2020.

(51) Int. Cl.
*H04W 8/24* (2009.01)
*H04W 4/08* (2009.01)
(Continued)

(52) U.S. Cl.
CPC ............... *H04W 8/24* (2013.01); *H04W 4/08* (2013.01); *H04W 72/51* (2023.01); *H04W 92/18* (2013.01)

(58) Field of Classification Search
CPC ......... H04W 8/22; H04W 8/24; H04W 8/245; H04W 72/51; H04W 4/06; H04W 4/08; H04W 92/18
See application file for complete search history.

(56) References Cited

U.S. PATENT DOCUMENTS

| 2014/0256334 A1* | 9/2014 | Kazmi ................. H04W 28/18 455/450 |
| 2016/0150426 A1* | 5/2016 | Panaitopol ............ H04W 84/18 370/252 |

(Continued)

FOREIGN PATENT DOCUMENTS

| EP | 2869658 A1 | 5/2015 |
| WO | 2016114640 A1 | 7/2016 |

(Continued)

OTHER PUBLICATIONS

International Search Report and Written Opinion—PCT/US2021/026148—ISA/EPO—dated Jul. 1, 2021.

*Primary Examiner* — Jenee Holland
(74) *Attorney, Agent, or Firm* — Qualcomm Incorporated/Seyfarth Shaw LLP

(57) ABSTRACT

This disclosure provides methods, devices and systems for facilitating device-to-device (D2D) communications on sidelinks. Some implementations more specifically relate to a user equipment (UE) determining sidelink communication parameter corresponding to UE assistance information or UE capability information. The UE may also determine an attribute associated with the sidelink communication parameter, the attribute indicating the sidelink communication parameter is a dynamic parameter or a static parameter. The UE may further transmit to another UE, on a sidelink, the sidelink communication parameter and the attribute. The UE (Continued)

may also communicate with the other UE on the sidelink based on the transmitted sidelink communication parameter and the attribute.

30 Claims, 10 Drawing Sheets

(51) Int. Cl.
*H04W 92/18* (2009.01)
*H04W 28/18* (2009.01)
*H04W 76/28* (2018.01)
*H04W 76/14* (2018.01)
*H04W 8/00* (2009.01)
*H04W 12/10* (2021.01)
*H04W 88/04* (2009.01)
*H04W 72/51* (2023.01)

(56) References Cited

U.S. PATENT DOCUMENTS

| | | | | |
|---|---|---|---|---|
| 2016/0295623 A1* | 10/2016 | Kazmi | ............ | H04W 76/15 |
| 2017/0208554 A1* | 7/2017 | Hoshino | ............ | H04W 52/248 |
| 2018/0242190 A1* | 8/2018 | Khoryaev | ............ | H04L 47/32 |
| 2018/0376525 A1* | 12/2018 | Feng | ............ | H04W 72/04 |
| 2019/0037621 A1* | 1/2019 | Feng | ............ | H04W 88/04 |
| 2019/0104525 A1* | 4/2019 | Santhanam | ............ | H04W 72/02 |
| 2019/0215685 A1* | 7/2019 | Wang | ............ | H04W 8/22 |
| 2019/0306923 A1* | 10/2019 | Xiong | ............ | H04J 13/0062 |
| 2019/0327593 A1* | 10/2019 | Pang | ............ | H04L 5/0091 |
| 2019/0356451 A1* | 11/2019 | Zhang | ............ | H04L 5/0053 |
| 2019/0373618 A1* | 12/2019 | Medina | ............ | H04L 5/0037 |
| 2019/0394665 A1* | 12/2019 | Kim | ............ | H04W 72/542 |
| 2020/0022089 A1* | 1/2020 | Guo | ............ | H04W 52/242 |
| 2020/0045758 A1* | 2/2020 | Breuer | ............ | H04W 76/12 |
| 2020/0053699 A1* | 2/2020 | Chen | ............ | H04W 4/44 |
| 2020/0053835 A1* | 2/2020 | Ye | ............ | H04L 1/08 |
| 2020/0187208 A1* | 6/2020 | Hou | ............ | H04L 5/0091 |
| 2021/0168826 A1* | 6/2021 | Zhao | ............ | H04L 5/0044 |
| 2021/0212148 A1* | 7/2021 | Liang | ............ | H04L 5/0044 |
| 2021/0243554 A1* | 8/2021 | Wu | ............ | H04W 72/51 |
| 2021/0307011 A1* | 9/2021 | Yang | ............ | H04W 72/54 |
| 2021/0329510 A1* | 10/2021 | Tseng | ............ | H04W 4/40 |
| 2021/0400665 A1* | 12/2021 | Zhao | ............ | H04W 72/0446 |
| 2022/0039080 A1* | 2/2022 | Khoryaev | ............ | H04W 4/40 |
| 2022/0210801 A1* | 6/2022 | Xu | ............ | H04W 72/21 |
| 2022/0286234 A1* | 9/2022 | Zhao | ............ | H04W 76/15 |
| 2022/0338295 A1* | 10/2022 | Lu | ............ | H04W 76/23 |

FOREIGN PATENT DOCUMENTS

| | | |
|---|---|---|
| WO | 2018016882 A1 | 1/2018 |
| WO | 2020030007 A1 | 2/2020 |

* cited by examiner

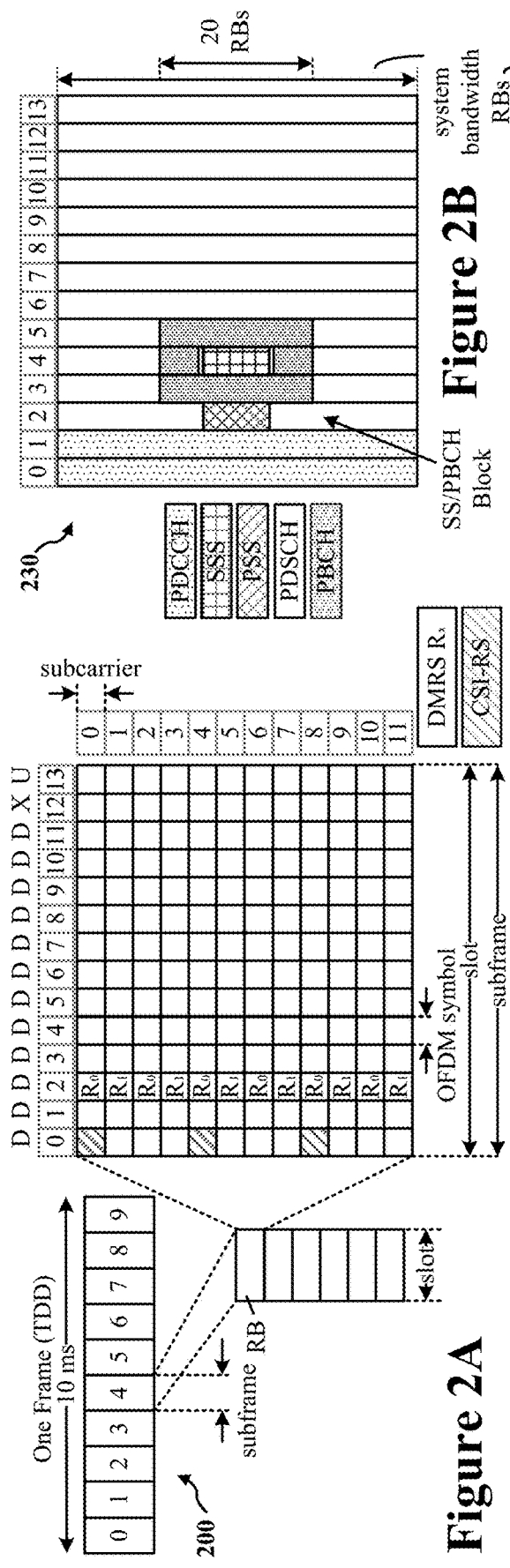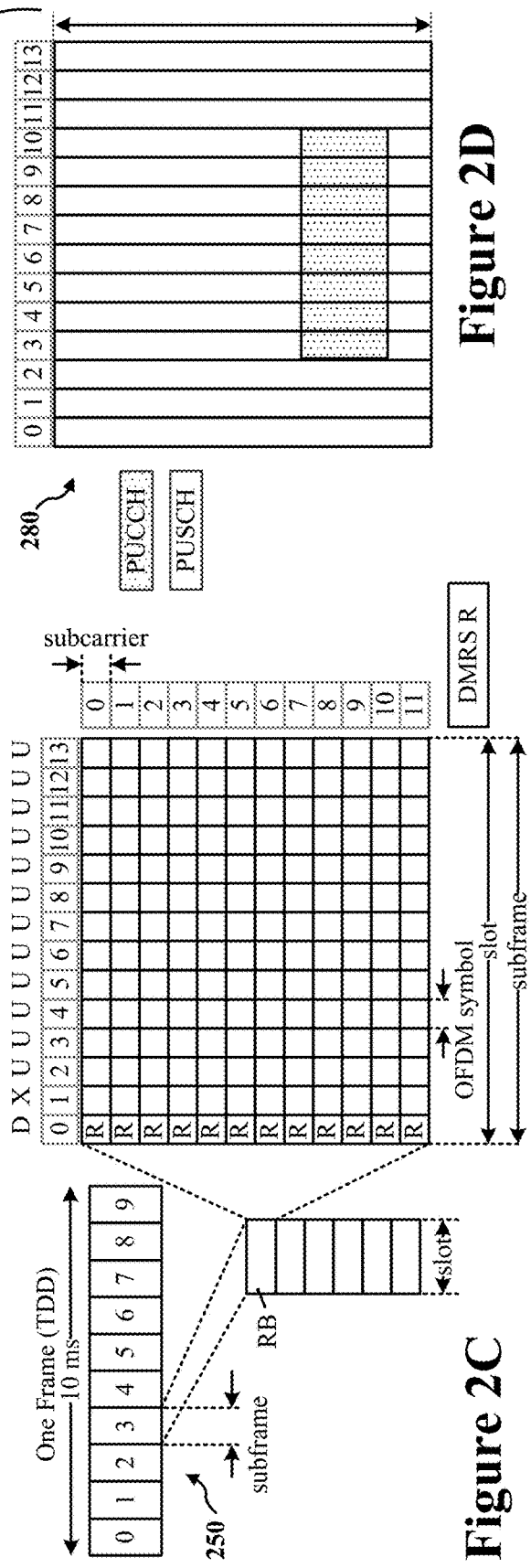

USER EQUIPMENT (UE) CAPABILITY AND ASSISTANCE INFORMATION EXCHANGE OVER SIDELINKS

CROSS-REFERENCE TO RELATED APPLICATION

The present application claims priority to U.S. Provisional Patent Application No. 63/008,599, filed on Apr. 10, 2020, and titled "USER EQUIPMENT (UE) CAPABILITY AND ASSISTANCE INFORMATION EXCHANGE OVER SIDELINKS," the disclosure of which is expressly incorporated by reference in its entirety.

TECHNICAL FIELD

This disclosure relates generally to wireless communication, and specifically, to techniques for communicating user equipment (UE) capability information and assistance information on a sidelink.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) new radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra-reliable low latency communications (URLLC). Some aspects of 5G/NR may be based on the 4G long term evolution (LTE) standard. There exists a need for further improvements in 5G/NR technology.

A sidelink may be an example of a device-to-device (D2D) communication link for user equipment (UEs) to communicate directly with one another. In such examples, the direct communication between UEs may bypass a base station. In some examples, a network coverage area may be extended based on the use of a sidelink. In some such examples, a UE operating within the coverage area of a base station may be designated as a relay UE to relay communication between the base station and an out-of-coverage UE. In such examples, the relay UE may use a sidelink to communicate with the out-of-coverage UE. In some other examples, local data services may be provided via the sidelink. In some such examples, a UE may provide various proximity-based services to one or more other UEs on the sidelink. Such proximity-based services may be provided via unicast, groupcast, or broadcast communication.

In some examples, UEs may exchange sidelink information to facilitate sidelink communication. The sidelink information may correspond to UE capability information or UE assistance information. The UE assistance information may include the UE's delay information, such as a signaling delay or a length of a discontinuous reception (DRX) cycle. The UE capability information may include the UE's supported capabilities, such as the UE's capability to operate as a relay. The UE capability information and assistance information are defined by existing 3GPP standards to be generally applicable for communication on a sidelink as well as communication on an access link (for example, an access link between a UE and a base station). In some examples, a UE may establish an access link based on UE capability information or assistance information shared by another UE. In such examples, due to the nature of D2D communication, the UE capability information or assistance information provided for establishing the access link may be less suitable for establishing a sidelink.

SUMMARY

In one aspect of the present disclosure, a method for wireless communication by a first user equipment (UE) includes determining a sidelink communication parameter corresponding to UE assistance information or UE capability information. The method further includes determining an attribute associated with the sidelink communication parameter, the attribute indicating the sidelink communication parameter is a dynamic parameter or a static parameter. The method still further includes transmitting to a second UE, on a sidelink, the sidelink communication parameter and the attribute. The method also includes communicating with the second UE on the sidelink based on the transmitted sidelink communication parameter and the attribute.

Another aspect of the present disclosure is directed to an apparatus for wireless communication by a first UE. The apparatus include means for determining a sidelink communication parameter corresponding to UE assistance information or UE capability information. The apparatus further includes means for determining an attribute associated with the sidelink communication parameter, the attribute indicating the sidelink communication parameter is a dynamic parameter or a static parameter. The apparatus still further includes means for transmitting to a second UE, on a sidelink, the sidelink communication parameter and the attribute. The apparatus also includes means for communicating with the second UE on the sidelink based on the transmitted sidelink communication parameter and the attribute.

In another aspect of the present disclosure, a non-transitory computer-readable medium with non-transitory program code recorded thereon for wireless communication by a first UE is disclosed. The program code is executed by a processor and includes program code to determine a sidelink communication parameter corresponding to UE assistance information or UE capability information. The program code further includes program code to determine an attribute associated with the sidelink communication parameter, the attribute indicating the sidelink communication parameter is a dynamic parameter or a static parameter. The program code still further includes program code to transmit to a second UE, on a sidelink, the sidelink communication parameter and the attribute. The program code also includes program code to communicate with the second UE on the sidelink based on the transmitted sidelink communication parameter and the attribute.

Another aspect of the present disclosure is directed to a first UE including a processor, and a memory communicatively coupled with the one or more processors and storing instructions that, when executed by the processor, causes the first UE to determine a sidelink communication parameter corresponding to UE assistance information or UE capability information. Execution of the instructions also cause the first UE to to determine an attribute associated with the sidelink communication parameter, the attribute indicating the sidelink communication parameter is a dynamic parameter or a static parameter. Execution of the instructions further cause the first UE transmit to a second UE, on a sidelink, the sidelink communication parameter and the attribute. Execution of the instructions still further cause the first UE to communicate with the second UE on the sidelink based on the transmitted sidelink communication parameter and the attribute.

In one aspect of the present disclosure, a method for wireless communication by a first UE includes receiving, on a sidelink from a second UE, a sidelink communication parameter corresponding to UE assistance information or UE capability information. The method further includes receiving, on the sidelink from the second UE, an attribute associated with the sidelink communication parameter, the attribute identifying the sidelink communication parameter as one of a dynamic parameter or a static parameter. The method still further includes selectively communicating with the second UE on the sidelink based on the sidelink communication parameter and the attribute.

Another aspect of the present disclosure is directed to an apparatus for wireless communication by a first UE. The apparatus includes means for receiving, on a sidelink from a second UE, a sidelink communication parameter corresponding to UE assistance information or UE capability information. The apparatus further includes means for receiving, on the sidelink from the second UE, an attribute associated with the sidelink communication parameter, the attribute identifying the sidelink communication parameter as one of a dynamic parameter or a static parameter. The apparatus still further includes means for selectively communicating with the second UE on the sidelink based on the sidelink communication parameter and the attribute.

In another aspect of the present disclosure, a non-transitory computer-readable medium with non-transitory program code recorded thereon for wireless communication by a first UE is disclosed. The program code is executed by a processor and includes program code to receive, on a sidelink from a second UE, a sidelink communication parameter corresponding to UE assistance information or UE capability information. The program code further includes program code to receive, on the sidelink from the second UE, an attribute associated with the sidelink communication parameter, the attribute identifying the sidelink communication parameter as one of a dynamic parameter or a static parameter. The program code still further includes program code to selectively communicate with the second UE on the sidelink based on the sidelink communication parameter and the attribute.

Another aspect of the present disclosure is directed to a first UE including a processor, and a memory communicatively coupled with the processor and storing instructions that, when executed by the processor, cause the first UE to receive, on a sidelink from a second UE, a sidelink communication parameter corresponding to UE assistance information or UE capability information. Execution of the instructions also cause the first UE to receive, on the sidelink from the second UE, an attribute associated with the sidelink communication parameter, the attribute identifying the sidelink communication parameter as one of a dynamic parameter or a static parameter. Execution of the instructions further cause the first UE to selectively communicate with the second UE on the sidelink based on the sidelink communication parameter and the attribute.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

FIGS. 2A, 2B, 2C, and 2D illustrate examples of a first fifth generation/new radio (5G/NR) frame, downlink (DL) channels within a 5G/NR slot, a second 5G/NR frame, and uplink (UL) channels within a 5G/NR slot, respectively, in accordance with aspects of the present disclosure.

DETAILED DESCRIPTION

Figure 1:
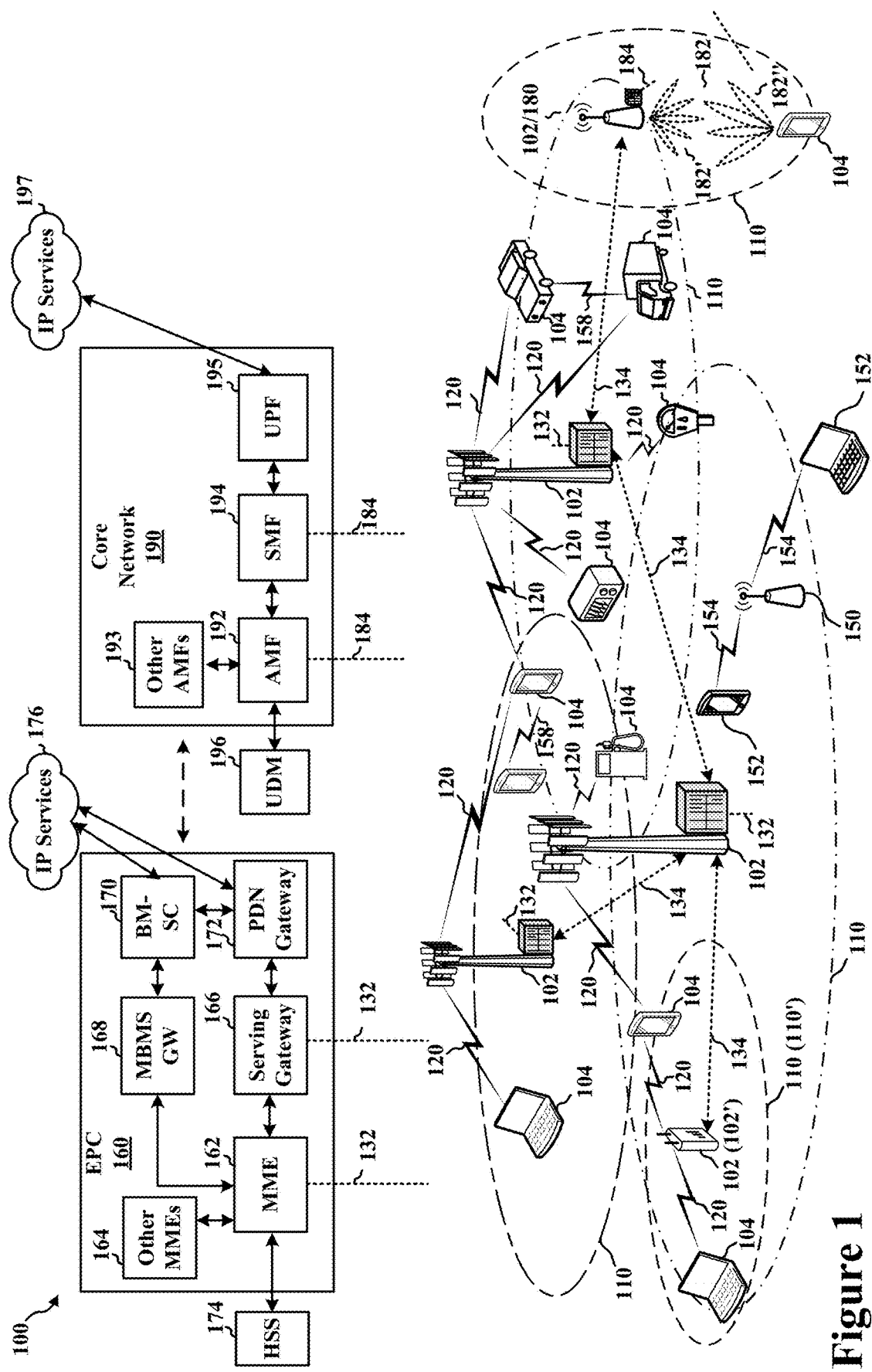
FIG. 1 illustrates a diagram of an example wireless communications system and an access network, in accordance with aspects of the present disclosure.

The following description is directed to some particular implementations for the purposes of describing innovative aspects of this disclosure. However, a person having ordinary skill in the art will readily recognize that the teachings can be applied in a multitude of different ways. The described implementations can be implemented in any device, system or network that is capable of transmitting and receiving radio frequency (RF) signals according to one or more of the long term evolution (LTE), 3G, 4G or 5G (new radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

Various implementations relate generally to facilitating device-to-device (D2D) communication on a sidelink (for example, a sidelink channel) established between two or more UEs. Some implementations more specifically relate to a UE providing supplemental information corresponding to a sidelink communication parameter to one or more other UEs on the sidelink. In some examples, the UE transmits both the supplemental information and the sidelink communication parameter to the other UEs on the sidelink. As used, the term "sidelink communication parameter" may refer to any capability, configuration, limitation, or requirement of a UE that may be reported as UE capability information or UE assistance information for a sidelink communication. The UE may transmit the supplemental information as an attribute associated with the sidelink communication parameter. In some implementations, the attribute may indicate whether a sidelink communication parameter is static or dynamic. In some other implementations, the attribute may indicate whether a sidelink communication parameter is broadcast to all UEs operating on the sidelink or unicast to a particular UE. Still further, in some implementations, the attribute may indicate whether a sidelink communication parameter is mandatory or optional.

Particular implementations of the subject matter described in this disclosure can be implemented to realize one or more of the following potential advantages. In some examples, the supplemental information may improve a UE's decision on whether to communicate with another UE. In some examples, one or more communication parameters may dynamically change based on changes to the UE's operating conditions or environment. By transmitting supplemental information, some aspects of the present disclosure may differentiate dynamic communication parameters from static communication parameters. In some other examples, a UE may support an expanded set of capabilities for a particular UE that may not be supported for other UEs. In some aspects of the present disclosure, the supplemental information may differentiate communication parameters that are broadcast to all UEs from other communication parameters that may be unicast to only a particular UE. In still some other examples, UEs may be configured to support one or more mandatory communication parameters. In some aspects of the present disclosure, the supplemental information may differentiate mandatory communication parameters from optional communication parameters.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates a diagram of an example wireless communications system and an access network 100. The wireless communications system (also referred to as a wireless wide area network (WWAN)) includes base stations 102, UEs 104, an evolved packet core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G/NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home evolved node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A illustrates an example of a first slot 200 within a 5G/NR frame structure. FIG. 2B illustrates an example of DL channels 230 within a 5G/NR slot. FIG. 2C illustrates an example of a second slot 250 within a 5G/NR frame structure. FIG. 2D illustrates an example of UL channels 280 within a 5G/NR slot. The 5G/NR frame structure may be frequency division duplex (FDD) in which, for a particular set of subcarriers (carrier system bandwidth), slots within the set of subcarriers are dedicated for either DL or UL In other cases, the 5G/NR frame structure may be time division duplex (TDD) in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100x is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment/negative acknowledgment (ACK/NACK) feedback. The PUSCH carries data, and may additionally be used to carry a buffer status report (BSR), a power headroom report (PHR), and/or UCI.

Figure 3:
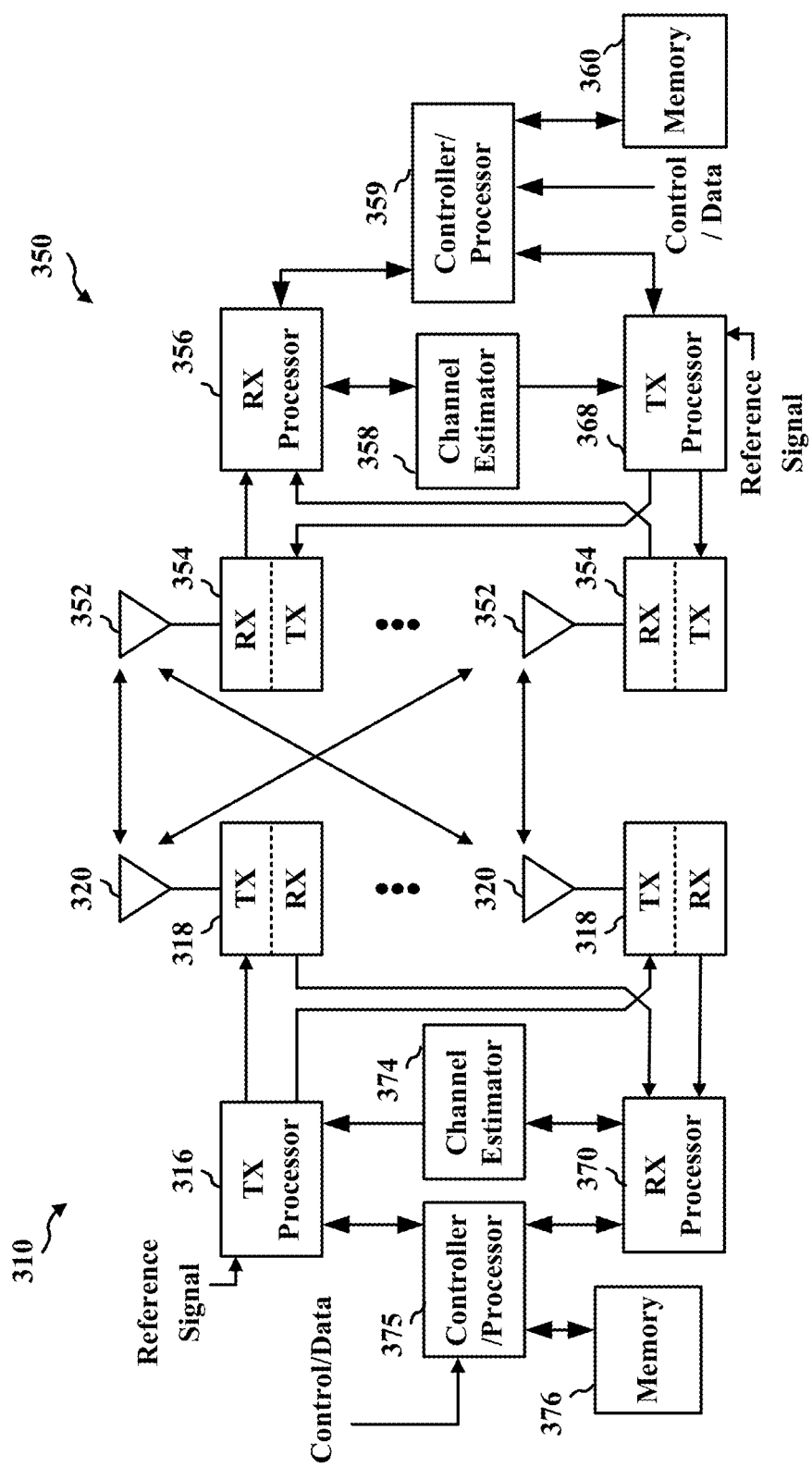
FIG. 3 illustrates a block diagram of an example base station and user equipment (UE) in an access network, in accordance with aspects of the present disclosure.

FIG. 3 illustrates a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Information to be wirelessly communicated (such as for LTE or NR based communications) is encoded and mapped, at the PHY layer, to one or more wireless channels for transmission.

As described above, a sidelink may be an example of a device-to-device (D2D) communication link for user equipment (UEs) to communicate directly with one another. In such examples, the direct communication between UEs may bypass a base station. In some examples, use of the sidelink may extend a network coverage area. In some such examples, a UE operating within the coverage area of a base station may be designated as a relay UE to relay communication between the base station and an out-of-coverage UE. In such examples, the relay UE may use a sidelink to communicate with the out-of-coverage UEs. In some other examples, local data services may be provided via a sidelink. In some such examples, a UE may provide various proximity-based services to one or more other UEs on the sidelink. Such proximity-based services may be provided via unicast, groupcast, or broadcast communication.

In some examples, UEs may exchange sidelink information to facilitate sidelink communication. The sidelink information may correspond to UE capability information or UE assistance information. The UE assistance information may include the UE's delay information, such as a signaling delay or a length of a long or short discontinuous reception (DRX) cycle. The UE capability information may include the UE's supported capabilities, such as the UE's capability to operate as a relay. The UE capability information and assistance information are defined by existing 3GPP standards to be generally applicable for sidelink communication as well as access link communication (for example, an access link between a UE and a base station). In some examples, a UE may establish an access link, such as a sidelink, based on UE capability information or assistance information shared by another UE. In such examples, due to the nature of D2D communication, the UE capability information or assistance information provided for establishing the access link may be less suitable for establishing a sidelink.

Various implementations relate generally to facilitating D2D communication on a sidelink. Some implementations more specifically relate to advertising supplemental information corresponding to a UE's sidelink communication parameters to other UEs. Additionally, as used, the term "communication parameter" may refer to a capability, configuration, limitation, or requirement of a UE that can be reported as UE capability information or UE assistance information. The UE may transmit the supplemental information to one or more UEs, via a sidelink or via an access link, as one or more attributes associated with the sidelink communication parameters. In some examples, the UE relays the supplemental information to the one or more UEs from a base station via an access link between the UE and the base station. In some implementations, an attribute may indicate whether a sidelink communication parameter is static or dynamic. In some other implementations, the attribute may indicate whether a sidelink communication parameter is broadcast to all UEs or unicast to a particular UE. Still further, in some implementations, the attribute may indicate whether the sidelink communications parameter is mandatory or optional for communicating with the UE. In some examples, the UE may indicate a certain capability is required for communications with the UE. As an example, the UE may indicate a relay capatability is required.

Figure 4:
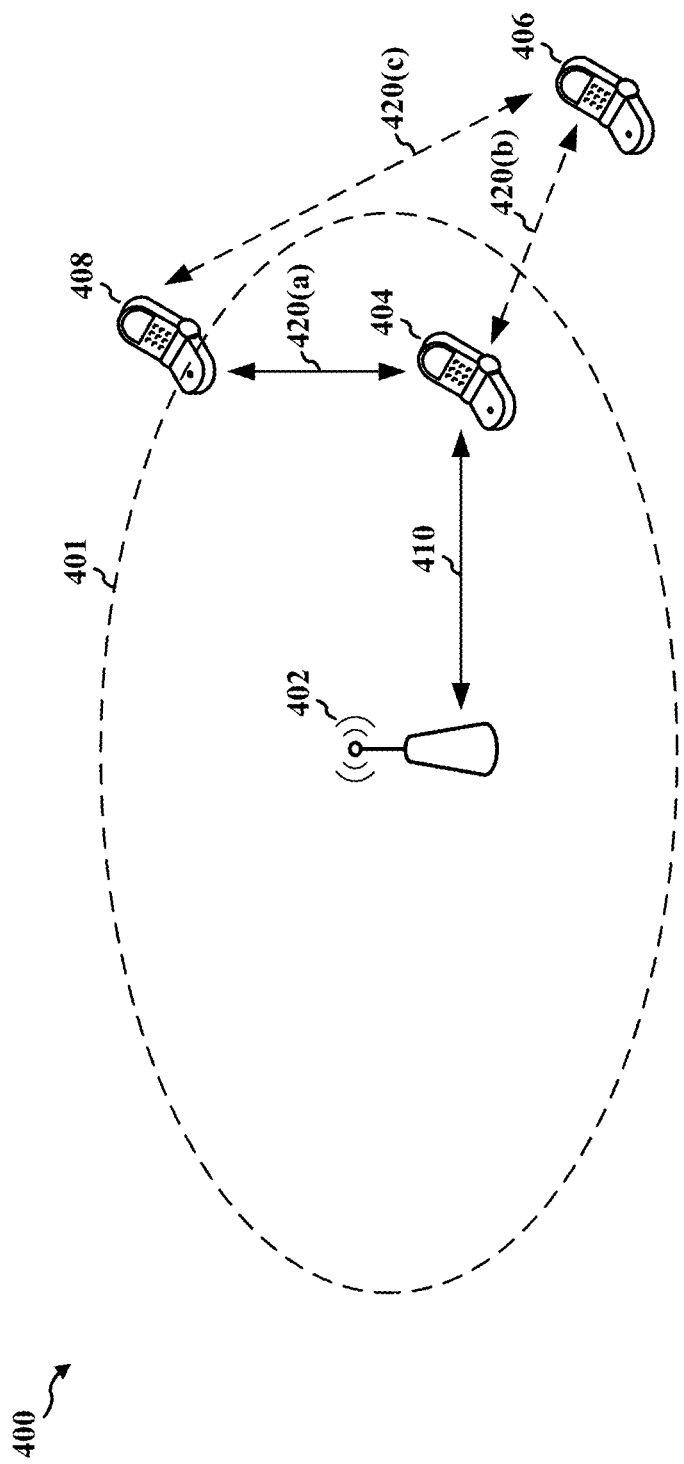
FIG. 4 illustrates an example wireless communication system including an access link and a sidelink, in accordance with aspects of the present disclosure.

FIG. 4 is a diagram illustrating an example of a wireless communication system 400 including an access link 410 and a sidelink 420, in accordance with aspects of the present disclosure. The wireless communication system 400 includes a base station 402 and multiple UEs 404, 406, and 408. In some implementations, the base station 402 may be one example of the base stations 102 and 310 of FIGS. 1 and 3, respectively. In some implementations, each of the UEs 404-408 may be one example of the UEs 104 and 350 of FIGS. 1 and 3, respectively. The sidelink 420 represents a set of resources (such as a PC5 interface) that may be used for D2D communication between the UEs 404, 406, and 408.

For purposes of illustration, in the example of FIG. 4, the sidelink 420 is depicted as a set of end-to-end communication links 420(a), 420(b), and 420(c) between respective pairs of UEs 404-408.

In the example of FIG. 4, the base station 402 communicates with a first UE 404 via the access link 410. Further, the first UE 404 may communicate with a second UE 408 via the sidelink 420. Additionally, the first UE 404 is within a coverage area 401 of the base station 402, the second UE 408 is on the edge of the coverage area 401, and a third UE 406 is outside the coverage area 401. In some implementations, the first UE 404 may function as a relay between the base station 402 and the second UE 408. In such implementations, the first UE 404 may forward communications received from the second UE 408 to the base station 402 and may forward communications received from the base station 402 to the second UE 408. In some other implementations, the first UE 404 and the second UE 408 may use the sidelink 420 to communicate directly with one another (with little or no involvement of the base station 402). In the example of FIG. 4, the third UE 406 is within communication range of the first UE 404 but is not yet connected on the sidelink 420.

To facilitate communications on the sidelink 420, the first UE 404 may report its sidelink communication parameters to the third UE 406 and the second UE 408. Similarly, each of the third UE 406 and the second UE 408 may report their respective sidelink communication parameters to the first UE 404 and to one another. The sidelink communication parameters may indicate UE capability information or UE assistance information. In some examples, the UE assistance information may include the UE's delay budget report identifying, for example, signaling delays, or a length of a long or short discontinuous reception (DRX) cycle. In some other examples, the UE capability information may include the UE's supported capabilities. In such examples, the UE's capability information may include, but is not limited to, whether the UE can operate as a relay, whether the UE supports full-duplex (FD) or half-duplex (HD) communications, whether the UE supports simultaneous communication on both an access link and a sidelink, or whether the UE supports communication on only one of the access link or the sidelink at any given time.

Aspects of the present disclosure recognize that some sidelink communication parameters may be static, whereas some other sidelink communication parameters may be dynamic. That is, a UE may dynamically change or update one or more of its communication parameters based on, for example, changes to the UE's operating conditions or environment. For example, a UE capable of functioning as a relay may select not to operate as a relay if the charge on its battery is below a charge threshold level or its own traffic demand exceeds a traffic threshold amount. A UE may also dynamically adjust the length of its DRX cycle based on the amount of charge remaining on its battery. Thus, dynamic communication parameters may include a UE's DRX cycle length and the capability of the UE to operate as a relay. On the other hand, a UE's ability to support FD or HD communications or its ability to support a number of simultaneous streams may not change regardless of the UE's operating conditions. Thus, static communication parameters may include the number of simultaneous streams of communications supported by a UE and the capability of a UE to support FD or HD communications.

Aspects of the present disclosure also recognize that the values of one or more sidelink communication parameters may be broadcast to all UEs on a sidelink. Additionally, one or more other values may be unicast to particular UEs on the sidelink. Thus, in some examples, a UE may support an expanded set of capabilities for a particular UE that may not be supported for other UEs operating on a sidelink. In some examples, a UE may support multiple component carriers for communications with a particular UE on a sidelink but may support only one component carrier for communications with each of one or more other UEs on the sidelink. In such examples, the multiple component carriers supported for the particular UE may be an example unicast value, whereas the one component carrier supported for all other UEs may be an example broadcast value. In some other examples, the length of a UE's DRX cycle should be the same for all other UEs operating on the sidelink. In such examples, the UE's DRX cycle length may be an example of a broadcast value.

Aspects of the present disclosure also recognize that some sidelink communication parameters may be mandatory, whereas some other sidelink communication parameters may be optional. In some examples, a UE may specify that all UEs operating on a sidelink with the UE should support one or more mandatory communication parameters. In some such examples, to maintain a threshold level of performance on a sidelink, a UE may require all other UEs on the sidelink with the UE to support one or more of a particular minimum bandwidth, particular security features, particular relay capabilities, or a particular transmit power control. In such examples, supported bandwidth, security features, relay capabilities, or transmit power control may be examples of mandatory communication parameters. Alternatively, a UE's ability to support FD or HD communications may have less impact on the overall performance of the sidelink. Thus, FD or HD communication support may be an example of an optional communication parameter. Aspects of the present disclosure further recognize that any communication parameters deemed optional by one UE may be deemed mandatory by another UE, and vice-versa.

Due to the dynamic nature of some sidelink communication parameters, some sidelink communication parameters may be specific to particular UEs and other sidelink communication parameters may be mandatory. Therefore, a UE may not provide a complete picture of its capabilities or requirements by merely reporting sidelink communication parameters. Thus, in some implementations, the UE also reports an attribute associated with the one or more sidelink communication parameters.

In some implementations, in the example of FIG. 4, each of the UEs 404-408 may advertise one or more attributes associated with the sidelink communication parameters reported on the sidelink 420. Some attributes may indicate whether one or more sidelink communication parameters are static or dynamic. Some other attributes may indicate whether one or more sidelink communication parameters include broadcast or unicast values. Still further, some attributes may indicate whether one or more sidelink communication parameters are mandatory or optional. In some implementations, the attributes may be transmitted in one or more RRC messages together with the sidelink communication parameters corresponding to the UE capability or assistance information.

In some implementations, one or more UEs may selectively communicate on the sidelink based on sidelink communication parameters and associated attributes reported by a UE. In the example of FIG. 4, the third UE 406 may determine whether to establish a sidelink communication with the first UE 404 or the second UE 408 based on the one or more sidelink communication parameters reported by the first UE 404 and the second UE 408, respectively, and the attributes associated with the reported sidelink communication parameters. Similarly, the first UE 404 and the second UE 408 may determine whether to establish a sidelink communication with the third UE 406 based on one or more sidelink communication parameters reported by the third UE 406 and the attributes associated with the reported sidelink communication parameters. Further, the second UE 408 may determine whether to maintain sidelink communications with the first UE 404 based on one or more sidelink communication parameters reported by the first UE 404 and the attributes associated with the reported sidelink communication parameters. In some implementations, the first UE 404 may receive a request from the second UE 408 to join a group associated with the sidelink, such as a group of UEs receiving a groupcast communication from the first UE 404. In such implementations, the first UE 404 may selectively allow the second UE 408 to join the group based on a capability of the second UE 408 to support a sidelink communication parameter reported to the first UE 404.

Figure 5:
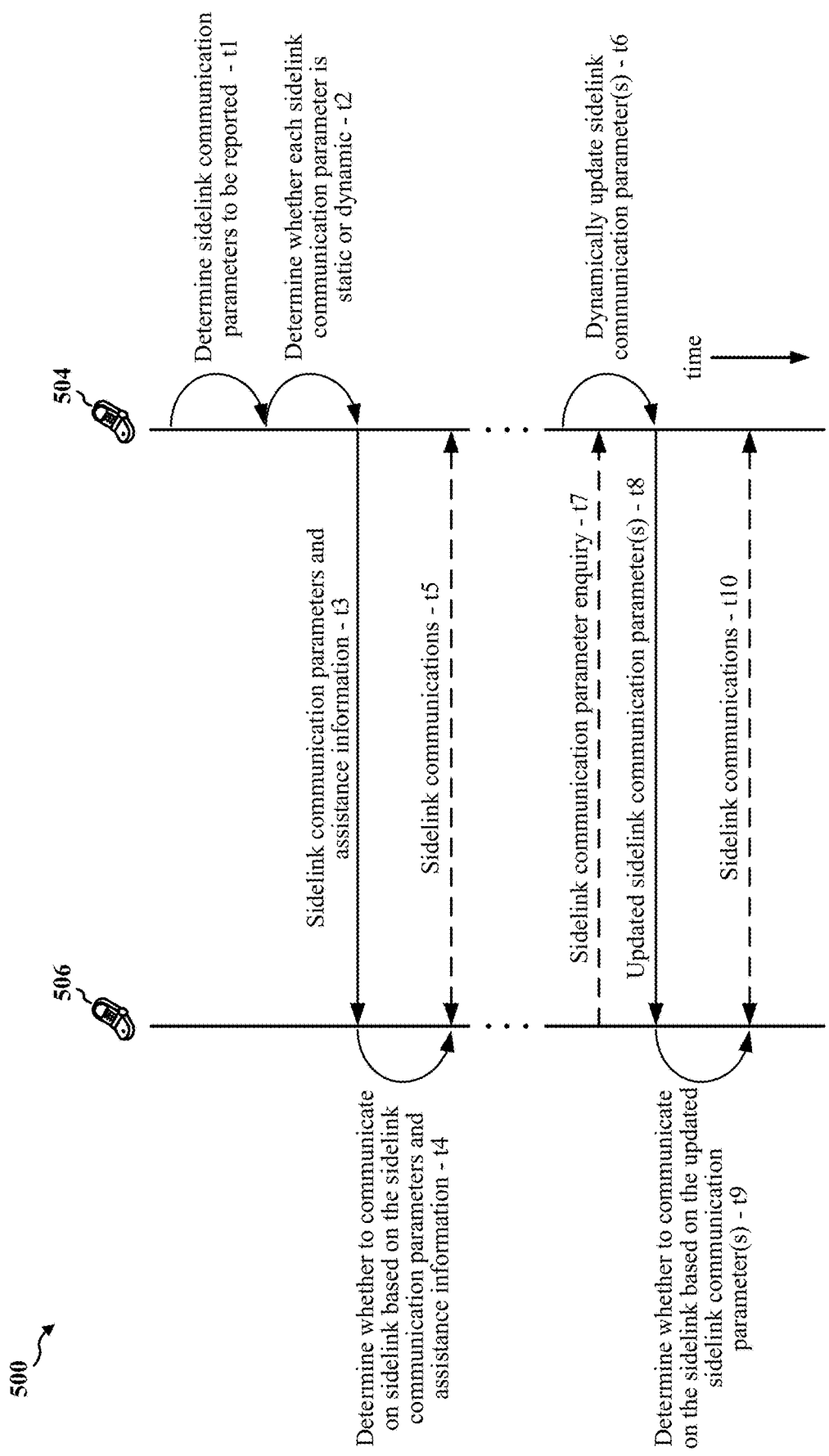
FIG. 5 illustrates an example of a timing diagram depicting an example message exchange between UEs communicating over a sidelink, in accordance with aspects of the present disclosure.

FIG. 5 illustrates a timing diagram 500 depicting an example message exchange between UEs 504 and 506 communicating over a sidelink, in accordance with aspects of the present disclosure. In some implementations, each of the UEs 504 and 506 may be one example of the UEs 404 and 408, respectively, of FIG. 4.

In the example of FIG. 5, at time t1, the first UE 504 initially determines one or more sidelink communication parameters to be reported to the second UE 506. The one or more sidelink communication parameters correspond to one or both of UE assistance information or UE capability information. In some implementations, the sidelink communication parameters may be reported in a UE assistance information report or a UE capability information report. Additionally, in some implementations, the first UE 504 may determine the one or more sidelink communication parameters to be reported in response to receiving a request (not shown for simplicity) from the second UE 506. As shown in FIG. 5, at time t2, the first UE 504 further determines whether each sidelink communication parameter is static or dynamic. The sidelink communication parameter may be static if the sidelink communication parameter remains the same each time the sidelink communication parameter is reported by the UE. The sidelink communication parameter may be dynamic if the sidelink communication parameter may change from one report to another. As shown in FIG. 5, at time t3, the first UE 504 transmits the one or more sidelink communication parameters and corresponding assistance information to the second UE 506 via the sidelink.

In the example of FIG. 5, at time t4, the second UE 506 determines whether to communicate with the first UE 504 based on the sidelink communication parameters and corresponding assistance information reported by the first UE 504. For example, the first UE 504 may report that it is capable of serving as a relay between the second UE 506 and a base station (such as the base station 402 of FIG. 4). However, the first UE 504 may also indicate that the reported relay capability is dynamic. In some such examples, the second UE 506 may require a persistent link with the base station, over a relatively long duration. Thus, in such examples, the second UE 506 may determine the first UE 504 is not suitable as a relay. On the other hand, if the second UE 506 only requires a temporary link with the base station or intends to communicate directly with the first UE 504, it may proceed to perform the sidelink communications with the UE 504 at time t5. In some implementations, at time t5, the second UE 506 establishes a new sidelink with the first UE 504 to perform the sidelink communications. Alternatively, at time t5, the second UE 506 may maintain an existing sidelink with the first UE 504.

In the example of FIG. 5, after some time has elapsed, at time t6, the first UE 504 may dynamically update one or more of its sidelink communication parameters. Additionally, the UE 504 may transmit updated sidelink communication parameters to the UE 506. In some implementations, at time t8, the UE 504 may proactively report the sidelink communication parameters to the second UE 506 in response to dynamically updating the sidelink communication parameters. In some other implementations, the first UE 504 may report the sidelink communication parameters to the second UE 506, at time t8, in response to receiving an inquiry from the second UE 506, at time t7. For example, the second UE 506 may know that one or more sidelink communication parameters of the first UE 504 may dynamically change. In such an example, the second UE 506 may request periodic updates or on-demand updates from the first UE 504.

As shown in FIG. 5, at time t9, the second UE 506 determines whether to communicate with the first UE 504 on the sidelink based on the updated sidelink communication parameters reported by the first UE 504. For example, although the first UE 504 may have previously reported that it is capable of serving as a relay between the second UE 506 and the base station, the first UE 504 may now report that it is no longer capable of functioning as a relay. In such an example, the second UE 506 may still require a link with the base station. Therefore, the second UE 506 may terminate sidelink communications with the first UE 504 and search for a new UE to serve as a relay. Alternatively, if the second UE 506 intends to only communicate directly with the first UE 504, the second UE 506 may continue to maintain communications with the first UE 504 on the sidelink. That is, as shown in FIG. 5, at time t10, the second UE 506 may maintain communications with the first UE 504 on the sidelink. Alternatively, at time t10, the second UE 506 may communicate with the first UE 504 on a new sidelink if the sidelink was not previously established.

Figure 6:
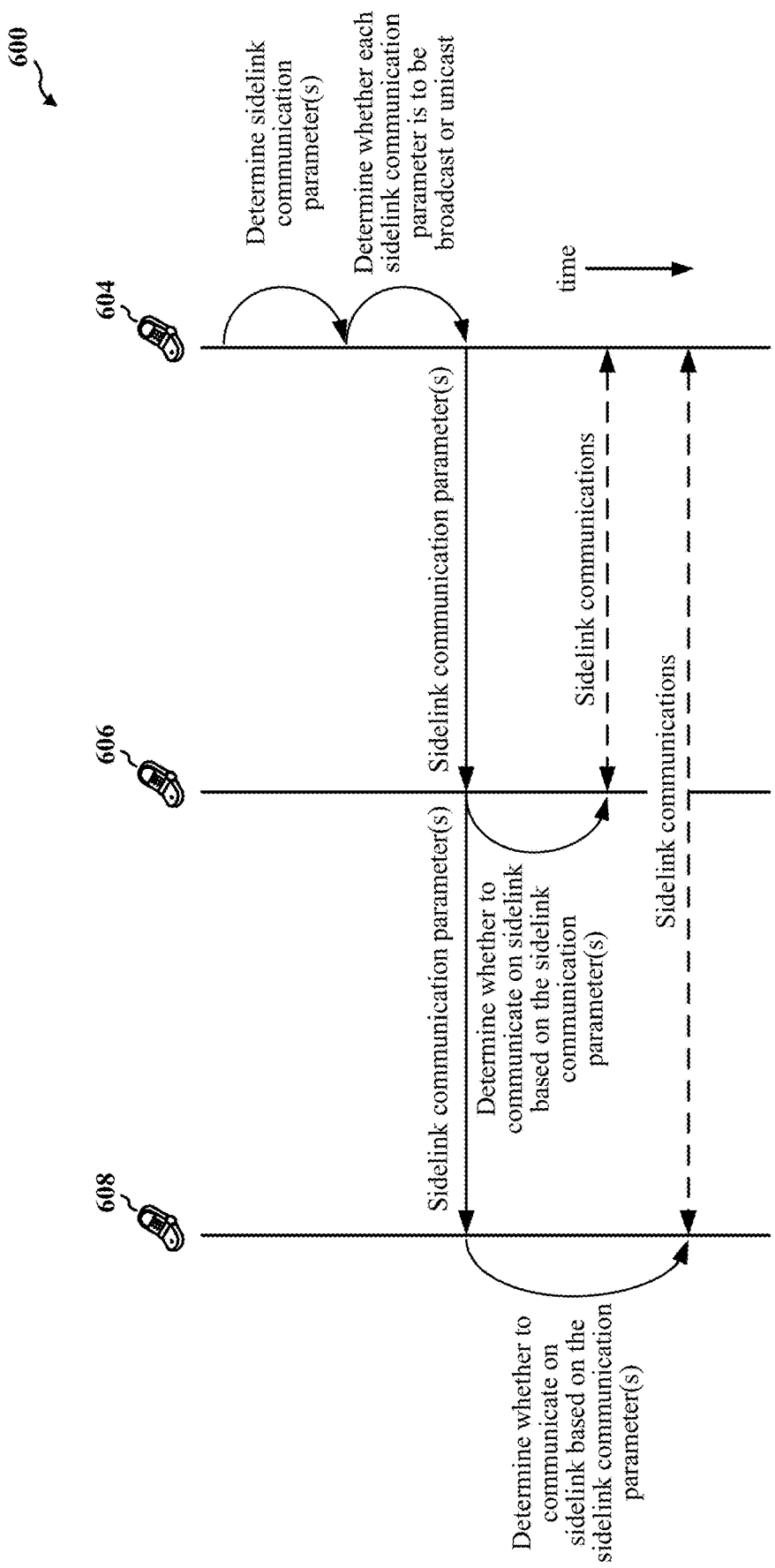
FIG. 6 illustrates a sequence diagram depicting an example message exchange between UEs communicating over a sidelink, in accordance with aspects of the present disclosure.

FIG. 6 illustrates a sequence diagram 600 depicting an example message exchange between UEs 604, 606, and 608 communicating over a sidelink, according to some implementations. In some implementations, each of the UEs 604, 606, and 608 may be one example of the UEs 404, 408, and 406, respectively, of FIG. 4.

In the example of FIG. 6, a first UE 604 initially determines one or more sidelink communication parameters to be reported to UEs 606 and 608. In some implementations, the sidelink communication parameters may be reported as UE assistance or capability information. Additionally, in some implementations, the first UE 604 may determine the one or more communication parameters to be reported in response to receiving an inquiry (not shown for simplicity) from a second UE 606 or a third UE 608. The first UE 604 may further determine whether each sidelink communication parameter is to be broadcast or unicast. A sidelink communication parameter may be broadcast if the sidelink communication parameter is broadly applicable to (or intended for) all UEs operating on the broadcast sidelink with the first UE 604. A sidelink communication parameter may be unicast if the value of the communication parameter is applicable to (or intended for) only a particular UE operating on the unicast sidelink with the first UE 604. At a finer granularity, some sidelink communication parameters may be broadcast while some other sidelink communication parameters may be unicast (as described with respect to FIG. 4). As shown in FIG. 6, the first UE 604 transmits one or more sidelink communication parameters, and an indication of whether each communication parameter is broadcast or unicast, to the second UE 606 and the third UE 608 via the sidelink. The indication of whether each sidelink communication parameter is broadcast or unicast may be an example of an attribute associated with each respective sidelink communication parameter.

In the example of FIG. 6, the second UE 606 receives the one or more sidelink communication parameters from the first UE 604 and selectively communicates on the sidelink based, at least in part, on the values of the one or more sidelink communication parameters reported by the first UE 604 and the indication of whether each sidelink communication parameter is broadcast or unicast. In the example of FIG. 6, the sidelink communication parameter may include an indication that one or more of the sidelink communication parameters are unicast or otherwise intended only for the second UE 606, while other sidelink communication parameters are broadcast to all UEs on the sidelink. For example, the first UE 604 may report that it is capable of supporting multiple component carriers only for communications with the second UE 606. In such an example, the second UE 606 may proceed to establish communications with the UE 604 on the sidelink if the multiple component carriers satisfy the requirements of the second UE 606. Alternatively, the second UE 606 may not establish communications with the first UE 604 if the multiple component carriers do not meet the requirements of UE 606.

In the example of FIG. 6, the third UE 608 also receives the one or more sidelink communication parameters from UE 604 and selectively communicates on the sidelink based, at least in part, on the one or more sidelink communication parameters reported by the first UE 604 and the indication of whether each sidelink communication parameter is broadcast or unicast. As described above, an attribute associated with each respective sidelink communication parameter may indicate whether the sidelink communication parameter is unicast or otherwise intended only for a particular UE, such as the third UE 608 or the second UE 606, while other sidelink communication parameters may be broadcast to all UEs on the sidelink. For example, the first UE 604 may report that it is capable of supporting only one component carrier for communications with all UEs (other than the second UE 606). In such an example, the third UE 608 may proceed to establish (or maintain) communications with the first UE 604 on the sidelink if the one component carrier satisfies the requirements of the third UE 608. Alternatively, the third UE 608 may not establish (or may terminate) communications with the first UE 604 if the one component carrier does not meet the requirements of the third UE 608.

Figure 7:
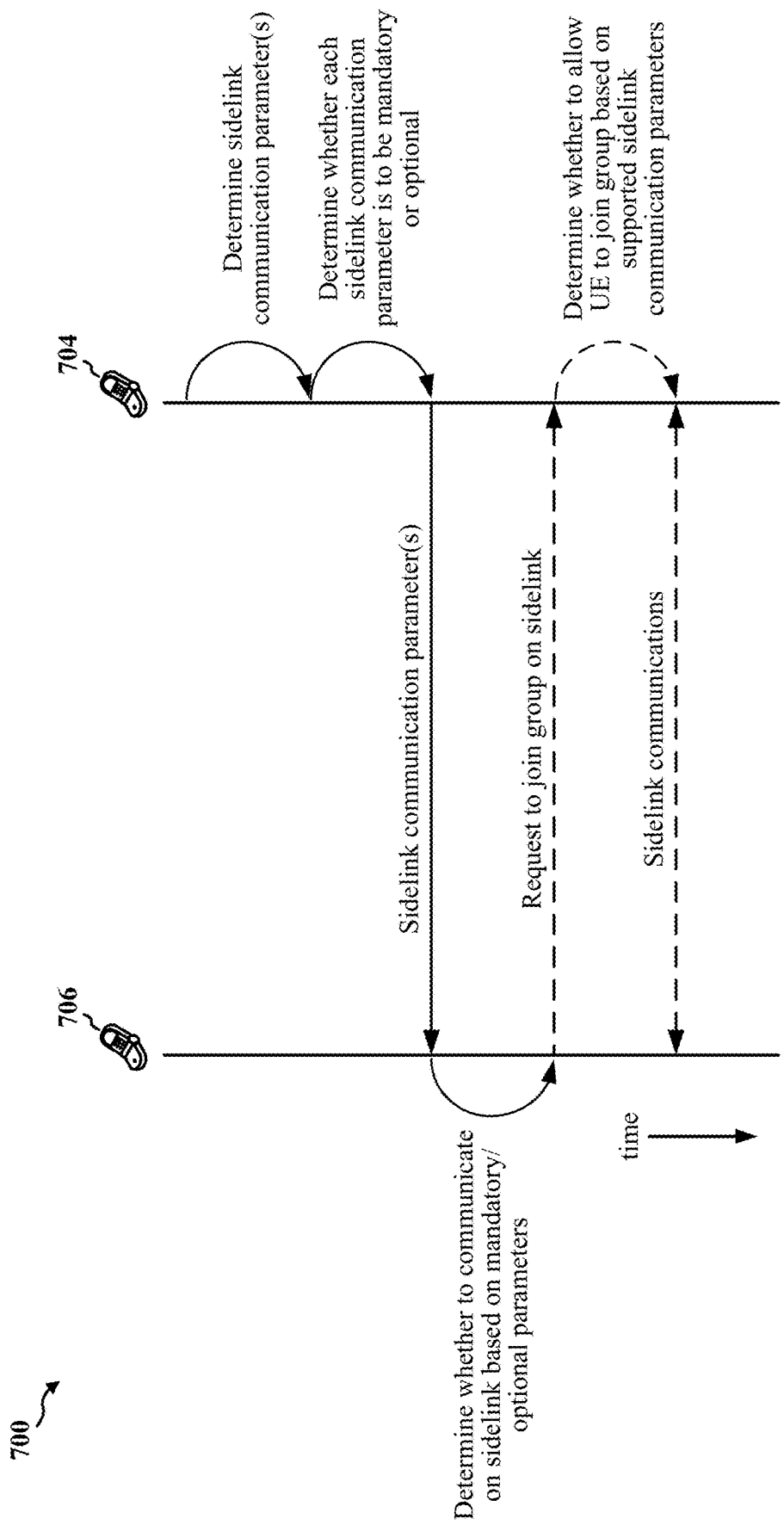
FIG. 7 illustrates a sequence diagram depicting an example message exchange between UEs communicating over a sidelink, in accordance with aspects of the present disclosure.

FIG. 7 illustrates a sequence diagram 700 depicting an example message exchange between UEs 704 and 706 communicating over a sidelink, in accordance with aspects of the present disclosure. In some implementations, each of the UEs 704 and 706 may be one example of the UEs 404 and 408, respectively, of FIG. 4.

In the example of FIG. 7, a first UE 704 initially determines one or more sidelink communication parameters to be reported to a second UE 706. The sidelink communication parameters may be reported as UE assistance or capability information. In some implementations, the first UE 704 may determine the one or more sidelink communication parameters to be reported in response to receiving an inquiry (not shown for simplicity) from the second UE 706. Additionally, in some implementations, the first UE 704 further determines whether each sidelink communication parameter is to be mandatory or optional. A sidelink communication parameter may be mandatory if the sidelink communication parameter must be supported by any UE operating on the sidelink with the first UE 704. A communication parameter may be optional if the sidelink communication parameter may or may not be supported by other UEs operating on the sidelink with the first UE 704. In the example of FIG. 7, the first UE 704 transmits, to the second UE 706 via the sidelink, the one or more sidelink communication parameters, and an attribute associated with each respective sidelink communication parameter indicating whether the sidelink communication parameter is mandatory or optional.

As shown in FIG. 7, the second UE 706 receives the one or more sidelink communication parameters from the first UE 704 and selectively communicates on the sidelink based, at least in part, on the one or more sidelink communication parameters reported by first UE 704 and the indication of whether each sidelink communication parameter is mandatory or optional. For example, the first UE 704 may report that all UEs on the sidelink must support a particular set of security features (to protect the integrity of D2D communications). In some implementations, the second UE 706 may determine whether to join a groupcast group operating on the sidelink based, at least in part, on its ability to support the mandatory communication parameters. For example, the second UE 706 may request to join the group only if it is capable of supporting the mandatory security features reported by the first UE 704.

In some other implementations, the first UE 704 may receive one or more sidelink communication parameters from the second UE 706 (not shown for simplicity). Each sidelink communication parameter may correspond to UE capability or assistance information of the second UE 706. In such implementations, the first UE 704 may determine whether to accept or deny the second UE's 706 request to join the group based on the communication parameters reported by the second UE 706. For example, the first UE 704 may determine whether to allow the second UE 706 to join the groupcast group based, at least in part, on whether the second UE 706 is capable of supporting the mandatory security features. In some implementations, where multiple UEs requesting to join the group are capable of supporting the mandatory communication parameters, the first UE 704 may determine which UEs to admit into the group based on other communication parameters reported by the requesting UEs (such as the level of security each UE can support).

Figure 8:
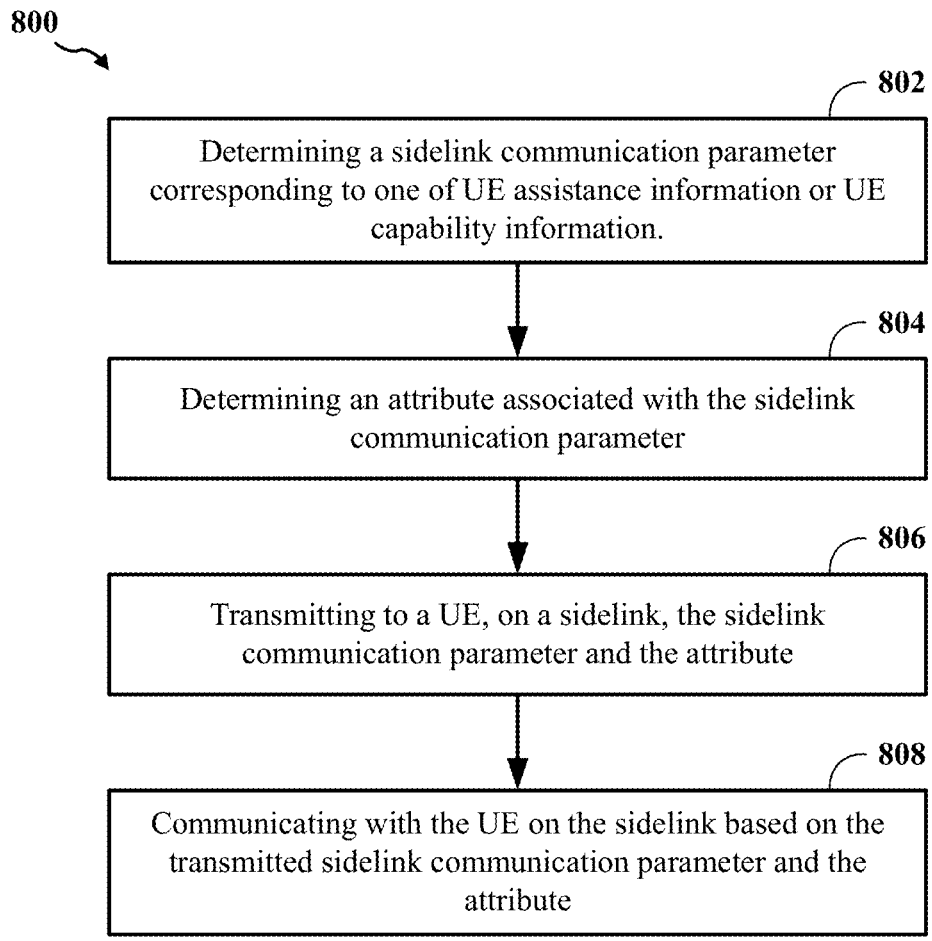
FIG. 8 illustrates a flowchart illustrating an example process for wireless communication that supports UE capability and assistance information exchange over a sidelink, in accordance with aspects of the present disclosure.

FIG. 8 illustrates a flowchart illustrating an example process 800 for wireless communication that supports UE capability and assistance information exchange over sidelinks according to some implementations. In some implementations, the process 800 may be performed by a wireless communication device operating as or within a UE, such as one of the UEs 104 or 350 described above with respect to FIGS. 1 and 3, respectively, or any of the UEs 404-408 described above with respect to FIG. 4.

In some implementations, the process 800 begins in block 802 with determining a sidelink communication parameter corresponding to UE assistance information or UE capability information. In block 804, the process 800 proceeds with determining an attribute associated with the sidelink communication parameter. The attribute may indicate whether the sidelink communication parameter is a dynamic parameter or a static parameter. In block 806, the process 800 proceeds with transmitting to a UE, on a sidelink, the sidelink communication parameter and the attribute. In block 808, the process 800 proceeds with communicating with the UE on the sidelink based on the transmitted sidelink communication parameter and the attribute.

Figure 9:
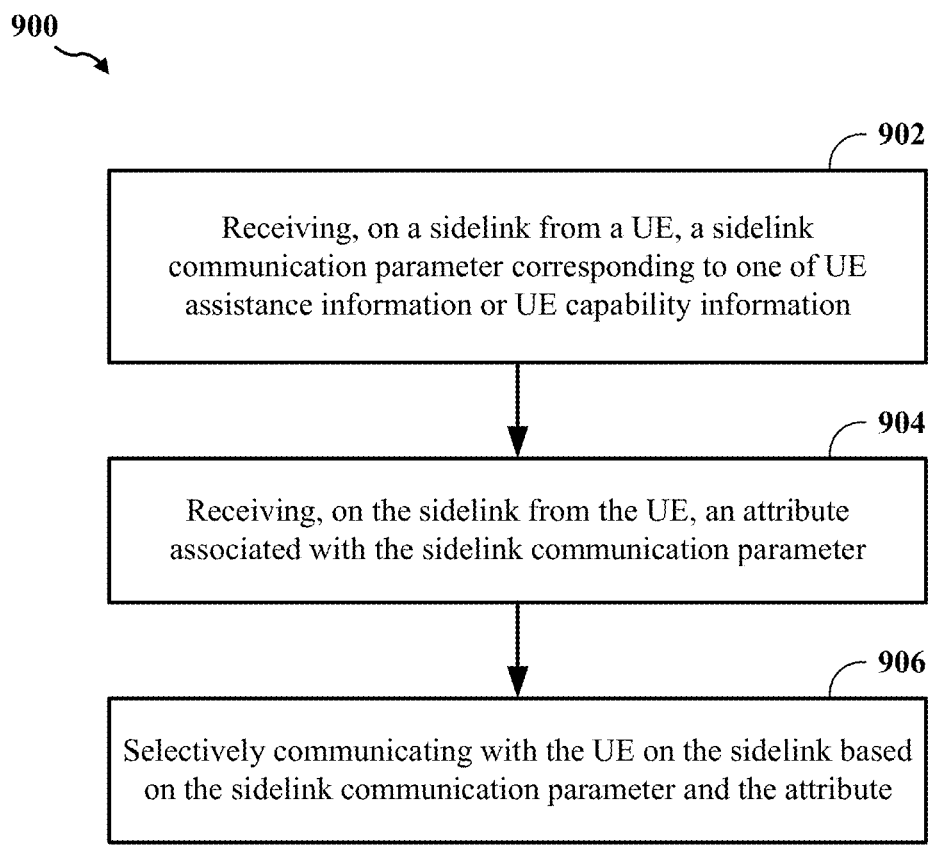
FIG. 9 illustrates a flowchart illustrating an example process for wireless communication that supports UE capability and assistance information exchange over a sidelink, in accordance with aspects of the present disclosure.

FIG. 9 illustrates a flowchart illustrating an example process 900 for wireless communication that supports UE capability and assistance information exchange over sidelinks according to some implementations. In some implementations, the process 900 may be performed by a wireless communication device operating as or within a UE, such as one of the UEs 104 or 350 described above with respect to FIGS. 1 and 3, respectively, or any of the UEs 404-408 described above with respect to FIG. 4.

In some implementations, the process 900 begins in block 902 with receiving from a UE, on a sidelink, a sidelink communication parameter corresponding to UE assistance information or UE capability information. In block 904, the process 900 proceeds with receiving from the UE, on the sidelink, an attribute associated with the sidelink communication parameter. The attribute may identify the sidelink communication parameter as one of a dynamic parameter or a static parameter. In block 906, the process 900 proceeds with selectively communicating with the UE, with the second UE on the sidelink based on the sidelink communication parameter and the attribute.

Figure 10:
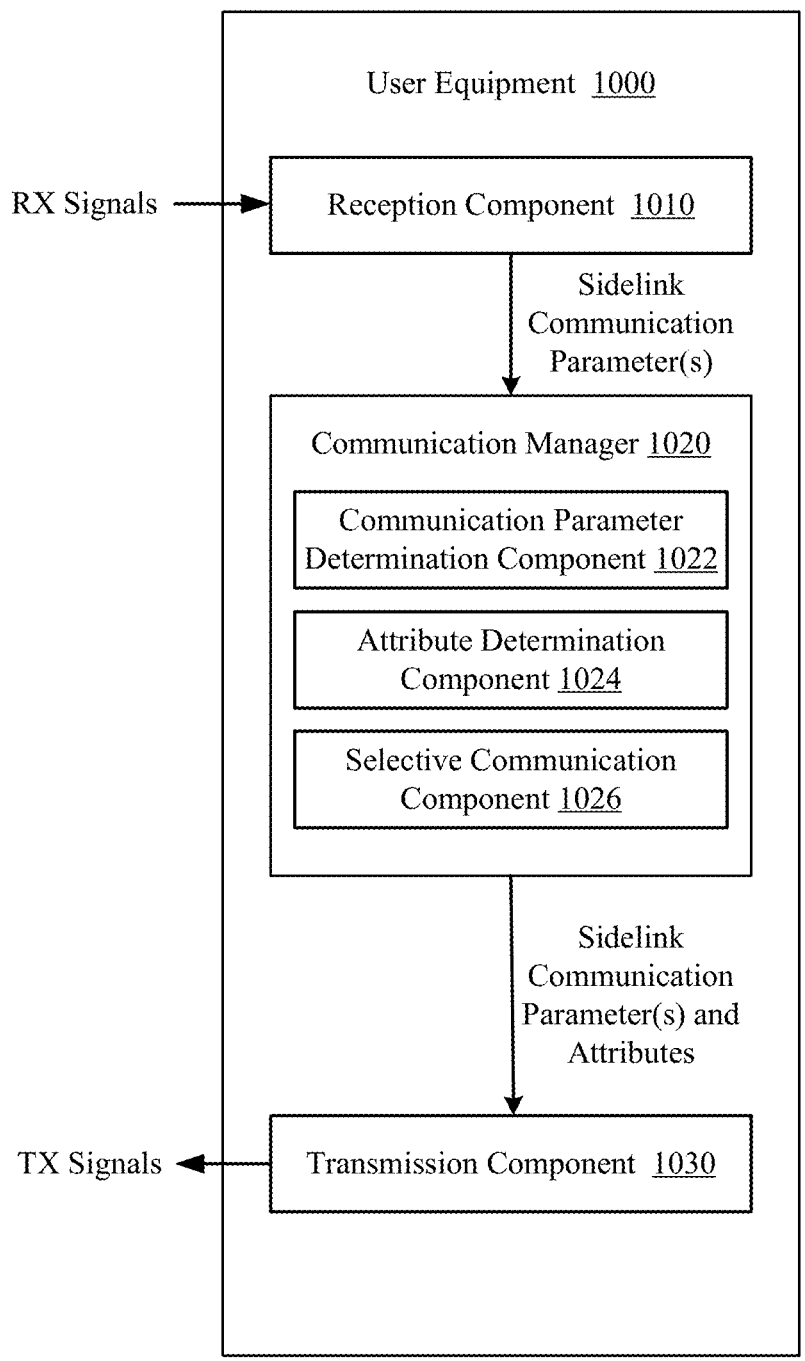
FIG. 10 illustrates a block diagram of an example UE, in accordance with aspects of the present disclosure.

FIG. 10 illustrates a block diagram of an example UE 1000 according to some implementations. In some implementations, the UE 1000 is configured to perform any of the processes 800 or 900 described above with reference to FIGS. 8 and 9, respectively. The UE 1000 can be an example implementation of the UE 350 described above with reference to FIG. 3. For example, the UE 1000 can be a chip, SoC, chipset, package, or device that includes at least one processor and at least one modem (for example, a Wi-Fi (IEEE 802.11) modem or a cellular modem).

The UE 1000 includes a reception component 1010, a communication manager 1020, and a transmission component 1030. The communication manager 1020 further includes a communication parameter determination component 1022, an attribute determination component 1024, and a selective communication component 1026. Portions of one or more of the components 1022-1026 may be implemented at least in part in hardware or firmware. In some implementations, at least some of the components 1022, 1024, or 1026 are implemented at least in part as software stored in a memory (such as the memory 360). For example, portions of one or more of the components 1022, 1024, and 1026 can be implemented as non-transitory instructions (or "code") executable by a processor (such as the controller/processor 359) to perform the functions or operations of the respective component.

The reception component 1010 is configured to receive RX signals from one or more wireless communication devices. In some implementations, the RX signals may include one or more sidelink communication parameters corresponding to UE assistance information or UE capability information reported by one or more UEs on a sidelink. The communication manager 1020 is configured to control or manage communications with the other UEs on the sidelink based, at least in part, on one or more sidelink communication parameters of the UE 1000 and the one or more sidelink communication parameters reported by the other UEs. In some implementations, the communication parameter determination component 1022 may determine a sidelink communication parameter corresponding to UE assistance information or UE capability information; the attribute determination component 1024 may determine an attribute associated with the sidelink communication parameter; and the selective communication component 1026 may determine whether to communicate with the other UEs, on the sidelink, based at least in part on sidelink communication parameter and the associated attribute reported by such UEs. The transmission component 1030 is configured to transmit the sidelink communication parameter and the attribute associated with the sidelink communication parameter, as one or more TX signals, to one or more wireless communication devices.

The following provides an overview of some Aspects of the present disclosure:

Aspect 1: A first UE, comprising a processor, and a memory communicatively coupled with the processor and storing instructions that, when executed by the processor, cause the first UE to determine a sidelink communication parameter corresponding to UE assistance information or UE capability information. Execution of the instructions also cause the first UE to determine an attribute associated with the sidelink communication parameter, the attribute indicating the sidelink communication parameter is a dynamic parameter or a static parameter. Execution of the instructions further cause the first UE to transmit to a second UE, on a sidelink, the sidelink communication parameter and the attribute. Execution of the instructions still further cause the first UE to communicate with the second UE on the sidelink based on the transmitted sidelink communication parameter and the attribute.

Aspect 2: The first UE of Aspect 1, wherein execution of the instructions further cause the first UE to receive a request from the second UE to join a group associated with the sidelink, and to selectively allow the second UE to join the group based on a capability of the second UE to support the sidelink communication parameter.

Aspect 3: The first UE of any of Aspects 1 through 2, wherein execution of the instructions further cause the first UE to dynamically update the sidelink communication parameter.

Aspect 4: The first UE of Aspect 3, wherein execution of the instructions further cause the first UE to transmit the updated sidelink communication parameter, on the sidelink, to the second UE responsive to the dynamic update.

Aspect 5: The first UE of Aspect 3, wherein execution of the instructions further cause the first UE: to receive, from the second UE, a request for an updated sidelink communication parameter, and to transmit the updated communication parameter, on the sidelink, to the second UE responsive to the received request.

Aspect 6: The first UE of any of Aspects 1 through 5, wherein execution of the instructions to determine the attribute further cause the first UE to determine whether to broadcast the sidelink communication parameter to all UEs operating on the sidelink or to unicast the sidelink communication parameter to the second UE.

Aspect 7: The first UE of Aspect 6, wherein the attribute further indicates the sidelink communication parameter is broadcast to all UEs operating on the sidelink.

Aspect 8: The first UE of Aspect 6, wherein the attribute further indicates that the sidelink communication parameter is unicast to the second UE.

Aspect 9: The first UE of any of Aspects 1 through 8, wherein the sidelink communication parameter indicates a capability of the first UE to operate as a relay, a minimum bandwidth supported by the first UE, one or more security features supported by the first UE, or a transmit power control supported by the first UE.

Aspect 10: The first UE of any of Aspects 1 through 9, wherein the sidelink communication parameter indicates a component carrier supported by the first UE or a discontinuous reception (DRX) cycle length of the first UE.

Aspect 11: A first UE, comprising a processor, and a memory communicatively coupled with the processor and storing instructions that, when executed by the processor, cause the first UE to receive, on a sidelink from a second UE, a sidelink communication parameter corresponding to UE assistance information or UE capability information. Execution of the instructions also cause the first UE to receive, on the sidelink from the second UE, an attribute associated with the sidelink communication parameter, the attribute identifying the sidelink communication parameter as one of a dynamic parameter or a static parameter. Execution of the instructions further cause the first UE to selectively communicate with the second UE on the sidelink based on the sidelink communication parameter and the attribute.

Aspect 12 The first UE of Aspect 11, wherein execution of the instructions further cause the first UE to receive dynamic updates to the sidelink communication parameter.

Aspect 13: The first UE of any of Aspects 11 through 12, wherein execution of the instructions further cause the first UE to transmit, to the second UE, a request for an updated sidelink communication parameter, and to receive, from the second UE, the updated sidelink communication parameter responsive to the request.

Aspect 14: The first UE of any of Aspects 11 through 13, wherein the attribute further indicates the sidelink communication parameter is broadcast to all UEs operating on the sidelink.

Aspect 15: The first UE of any of Aspects 11 through 14, wherein the attribute further indicates the sidelink communication parameter is unicast to the first UE.

Aspect 16: The first UE of any of Aspects 11 through 15, wherein the attribute further indicates support for the sidelink communication parameter is optional.

Aspect 17: The first UE of any of Aspects 11 through 16, wherein the attribute further indicates support for the sidelink communication parameter is mandatory.

Aspect 18. The first UE of any of Aspects 11 through 17, wherein the sidelink communication parameter indicates a capability of the second UE to operate as a relay, a minimum bandwidth supported by the second UE, one or more security features supported by the second UE, a component carrier supported by the second UE, a discontinuous reception (DRX) cycle length of the second UE, or a transmit power control supported by the second UE.

As used, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed may be implemented as electronic hardware, firmware, software, or combinations of hardware, firmware, or software, including the structures disclosed in this specification and the structural equivalents thereof. The interchangeability of hardware, firmware, and software has been described generally, in terms of functionality, and illustrated in the various illustrative components, blocks, modules, circuits, and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined may be applied to other implementations without departing from the spirit or scope of this disclosure. Thus, the claims are not intended to be limited to the implementations shown, but are to be accorded the widest scope consistent with this disclosure, the principles, and the novel features disclosed.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A first user equipment (UE), comprising:
  a processor; and
  a memory communicatively coupled with the processor and storing instructions that, when executed by the processor, cause the first UE to:
    determine a sidelink communication parameter corresponding to UE assistance information or UE capability information, the determination of the sidelink communication parameter including identifying the sidelink communication parameter from a set of sidelink communication parameters pre-defined at the first UE or dynamically originating the sidelink communication parameter at the first UE, in accordance with a current operating condition associated with the first UE;
    determine an attribute associated with the sidelink communication parameter, the attribute indicating the sidelink communication parameter is a dynamic parameter or a static parameter;
    transmit to a second UE, on a sidelink, the sidelink communication parameter and the attribute; and communicate with the second UE on the sidelink based on the transmitted sidelink communication parameter and the attribute.

2. The first UE of claim 1, wherein execution of the instructions further cause the first UE:
to receive a request from the second UE to join a group associated with the sidelink; and
to selectively allow the second UE to join the group based on a capability of the second UE to support the sidelink communication parameter.

3. The first UE of claim 1, wherein execution of the instructions further cause the first UE to dynamically update the sidelink communication parameter.

4. The first UE of claim 3, wherein execution of the instructions further cause the first UE to transmit the updated sidelink communication parameter, on the sidelink, to the second UE responsive to the dynamic update.

5. The first UE of claim 3, wherein execution of the instructions further cause the first UE:
to receive, from the second UE, a request for an updated sidelink communication parameter; and
to transmit the updated sidelink communication parameter, on the sidelink, to the second UE responsive to the received request.

6. The first UE of claim 1, wherein execution of the instructions to determine the attribute further causes the first UE to determine whether to broadcast the sidelink communication parameter to all UEs operating on the sidelink or to unicast the sidelink communication parameter to the second UE.

7. The first UE of claim 6, wherein the attribute further indicates the sidelink communication parameter is broadcast to all UEs operating on the sidelink.

8. The first UE of claim 6, wherein the attribute further indicates that the sidelink communication parameter is unicast to the second UE.

9. The first UE of claim 1, wherein the sidelink communication parameter indicates a capability of the first UE to operate as a relay, a minimum bandwidth supported by the first UE, one or more security features supported by the first UE, a component carrier supported by the first UE, a discontinuous reception (DRX) cycle length of the first UE or a transmit power control supported by the first UE.

10. A method of wireless communication by a first user equipment (UE), comprising:
determining a sidelink communication parameter corresponding to UE assistance information or UE capability information, the determination of the sidelink communication parameter including identifying the sidelink communication parameter from a set of sidelink communication parameters pre-defined at the first UE or dynamically originating the sidelink communication parameter at the first UE, in accordance with a current operating condition associated with the first UE;
determining an attribute associated with the sidelink communication parameter, the attribute indicating the sidelink communication parameter is a dynamic parameter or a static parameter;
transmitting to a second UE, on a sidelink, the sidelink communication parameter and the attribute; and
communicating with the second UE on the sidelink based on the transmitted sidelink communication parameter and the attribute.

11. The method of claim 10, wherein the attribute indicates further indicates the sidelink communication parameter is optional.

12. The method of claim 10, wherein the attribute indicates further indicates the sidelink communication parameter is mandatory.

13. The method of claim 10, wherein determining the attribute comprises determining whether to broadcast the sidelink communication parameter to all UEs operating on the sidelink or to unicast the sidelink communication parameter to the second UE.

14. The method of claim 10, wherein the attribute further indicates that the sidelink communication parameter is broadcast to all UEs operating on the sidelink.

15. The method of claim 10, wherein the attribute further indicates that the sidelink communication parameter is unicast to the second UE.

16. The method of claim 10, wherein the sidelink communication parameter indicates a capability of the first UE to operate as a relay, a minimum bandwidth supported by the first UE, one or more security features supported by the first UE, a component carrier supported by the first UE, a discontinuous reception (DRX) cycle length of the first UE, or a transmit power control supported by the first UE.

17. The method of claim 10, further comprising:
receiving a request from the second UE to join a group associated with the sidelink; and
selectively allowing the second UE to join the group based at least in part on a capability of the second UE to support the value of the sidelink communication parameter.

18. A first user equipment (UE), comprising:
a processor; and
a memory communicatively coupled with the processor and storing instructions that, when executed by the processor, cause the first UE to:
receive, on a sidelink from a second UE, a sidelink communication parameter corresponding to UE assistance information or UE capability information, the determination of the sidelink communication parameter including identifying the sidelink communication parameter from a set of sidelink communication parameters pre-defined at the first UE or dynamically originating the sidelink communication parameter at the first UE, in accordance with a current operating condition associated with the first UE;
receive, on the sidelink from the second UE, an attribute associated with the sidelink communication parameter, the attribute identifying the sidelink communication parameter as one of a dynamic parameter or a static parameter; and
selectively communicate with the second UE on the sidelink based on the sidelink communication parameter and the attribute.

19. The first UE of claim 18, wherein execution of the instructions further cause the first UE to receive dynamic updates to the sidelink communication parameter.

20. The first UE of claim 18, wherein execution of the instructions further cause the first UE:
to transmit, to the second UE, a request for an updated sidelink communication parameter; and
to receive, from the second UE, the updated sidelink communication parameter responsive to the request.

21. The first UE of claim 18, wherein the attribute further indicates the sidelink communication parameter is broadcast to all UEs operating on the sidelink.

22. The first UE of claim 18, wherein the attribute further indicates the sidelink communication parameter is unicast to the first UE.

23. The first UE of claim 18, wherein the attribute further indicates support for the sidelink communication parameter is optional.

24. The first UE of claim 18, wherein the attribute further indicates support for the sidelink communication parameter is mandatory.

25. The first UE of claim 18, wherein the sidelink communication parameter indicates a capability of the second UE to operate as a relay, a minimum bandwidth supported by the second UE, one or more security features supported by the second UE, a component carrier supported by the second UE, a discontinuous reception (DRX) cycle length of the second UE, or a transmit power control supported by the second UE.

26. A method of wireless communication by a first user equipment (UE), comprising:
   receiving, on a sidelink from a second UE, a sidelink communication parameter corresponding to UE assistance information or UE capability information, the determination of the sidelink communication parameter including identifying the sidelink communication parameter from a set of sidelink communication parameters pre-defined at the first UE or dynamically originating the sidelink communication parameter at the first UE, in accordance with a current operating condition associated with the first UE;
   receiving, on the sidelink from the second UE, an attribute associated with the sidelink communication parameter, the attribute identifying the sidelink communication parameter as one of a dynamic parameter or a static parameter; and
   selectively communicating with the second UE on the sidelink based on the sidelink communication parameter and the attribute.

27. The method of claim 26, further comprising receiving dynamic updates to the sidelink communication parameter.

28. The method of claim 26, wherein the attribute further indicates the sidelink communication parameter is broadcast to all UEs operating on the sidelink or unicast to the first UE.

29. The method of claim 26, wherein the attribute further indicates support for the sidelink communication parameter is optional or mandatory.

30. The method of claim 26, wherein the sidelink communication parameter indicates a capability of the second UE to operate as a relay, a minimum bandwidth supported by the second UE, one or more security features supported by the second UE, a component carrier supported by the second UE, a discontinuous reception (DRX) cycle length of the second UE, or a transmit power control supported by the second UE.

* * * * *